Dec. 22, 1931.  W. J. MILLER  1,837,788
OIL WELL TESTING DEVICE
Filed March 7, 1929   2 Sheets-Sheet 2
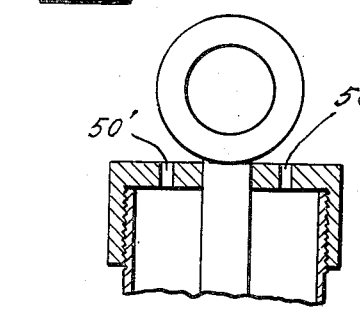
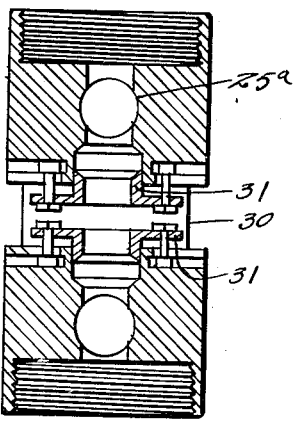
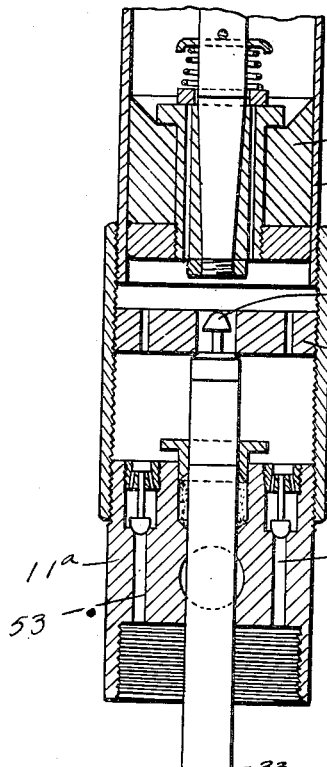
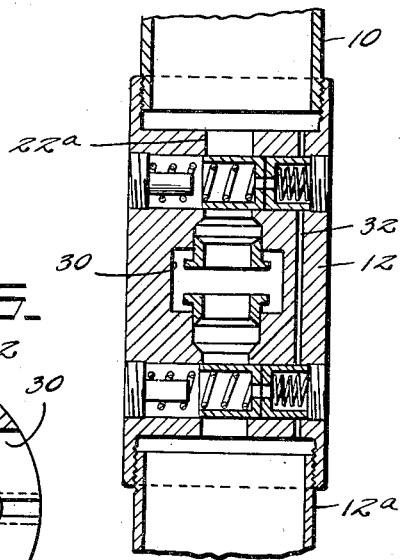
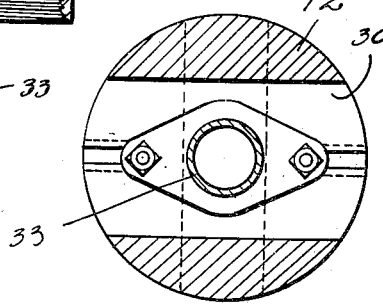
Inventor
W. J. Miller
By Watson E. Coleman Patented Dec. 22, 1931

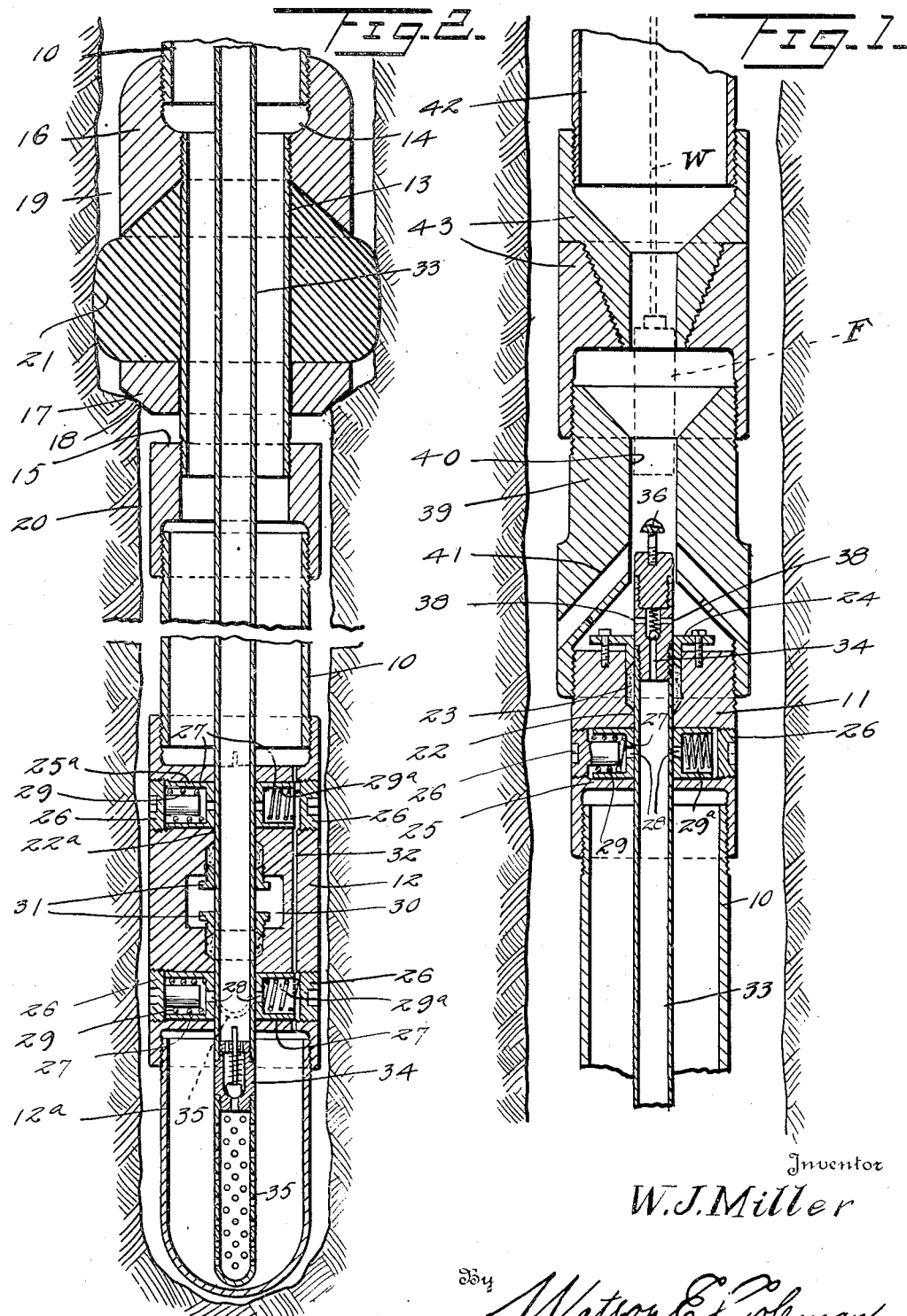

1,837,788

UNITED STATES PATENT OFFICE

WILLIAM JOSEPH MILLER, OF SULPHUR, LOUISIANA

OIL WELL TESTING DEVICE

Application filed March 7, 1929. Serial No. 345,069.

This invention relates to oil well testing devices and more particularly to a device for removing from a bored well which has entered the pay sand, a sample of the contents of the well so that it may be determined whether the production will warrant casing of the well.

The principal object of the present invention is the production of a device of this character which may be entered in the test bore in a sealed condition and the sample of the contents of the test bore removed therefrom unmixed with the contents of the well above this bore.

A further and more specific object of the invention is the provision of a device of the character which employs a vacuum chamber and may be operated to place this vacuum chamber in communication with the contents of the test bore.

A still further object of the invention is to provide a device of this character which may be employed either as a dry pipe tester wherein the pipe from which the testing device is supported is sealed from communication with the contents of the well above the test bore or as a wet pipe tester wherein the contents of the well are allowed to enter the manipulating pipe above the testing device destroying the buoyancy thereof and allowing the weight of this pipe to act to effectually prevent blowing out of the pipe and of the contents of the well during the testing operation.

The former construction that is ordinarily employed in oil well testing is dangerous in that it is subjected to considerable damage in the event the sand produces gas heavily and accordingly generates considerable pressure below the seal provided at the upper end of the test bore when the tester is in position. Such a construction is, however, capable of economic use in sands which are heavy gas producers.

A still further object of the invention is to produce a device of this character which is readily convertible to allow it to be employed in either of the manners above described and which may be readily and cheaply manufactured and controlled.

A further and important object of the invention is the provision of a structure of this character which may be operated to start the test after the tester is in position by means of a controlling wire line which is led to the tester through the center of the pipe from which the tester is supported.

These and other objects I attain by the structure shown in the accompanying drawings wherein for the purpose of illustration I have shown a preferred embodiment of my invention and wherein:—

Figure 1 is a sectional view through the upper portion of a testing device constructed in accordance with my invention, the supporting tubing being shown and a fishing tool for manipulating the control element indicated in dotted lines;

Figure 2 is a sectional view through the lower section of the testing device showing the same seated in the rat-hole and indicating the control device in the initial control position in dotted lines;

Figure 3 is a view of the lower head similar to that of Figure 2, but showing the position of the parts when the control element is removed;

Figure 4 is a sectional view through the lower head at right angles to the view of Figure 2, certain of the parts being removed;

Figure 5 is a detailed sectional view through the upper head at right angles to the view of Figure 1, showing connections permitting attachment of a vacuum pump for evacuating a testing device;

Figure 6 is a transverse sectional view through the lower head at the inlet port;

Figure 7 is a sectional view showing a modified means for evacuating the testing device.

Referring now more particularly to the drawings, the tester comprises a tubular body 10 having upper and lower heads 11 and 12. The tubular body intermediate its ends is slightly reduced in diameter, as indicated at 13, thereby producing upper and lower opposed shoulders 14 and 15 against which are fitted upper and lower packing rings 16 and 17. The upper packing ring is stationary and may form a coupling connecting the reduced section of the tube to the upper normally sized section thereof while the lower ring is vertically movable and has a downwardly tapered face 18 adapted to seat upon the shoulder formed at the junction of the main bore 19 of a well with the test bore or rat-hole 20 forming an axial prolongation of this main bore. Between the packing rings is disposed an annular compressible packing rubber element 21, which as the movable packing ring comes into engagement with the shoulder at the rat-hole, is compressed by a continued downward movement of the testing device and thus brought into sealing engagement with the walls of the main bore immediately above this shoulder.

The upper head 11 has an axial bore 22, the upper end of which is enlarged to form a seat for packing 23 and to receive a gland follower for compressing this packing. This bore below the end of the packing gland is interrupted by a transverse bore 25, the opposite ends of which are closed by removable plugs 26. Slidable in the bore between these plugs are valve elements 27 each in the form of a piston having its head inwardly arranged and provided with an aperture 28. Each of these pistons is forced toward the center of the bore by a spring, the spring 29 of one piston being of greater strength than the spring 29$^a$ of the other piston so that the piston 27 projected by the spring 29 normally extends across and intercepts the bore 22 while the other of the pistons is forced inwardly against its plug.

The lower head has an axial bore 22$^a$ of the same diameter as the bore of the upper head aligned therewith. This lower head intermediate its ends is traversed by a transverse opening 30, the axial bore 22$^a$ being enlarged and provided with glands 31 at opposite sides of the opening. The lower head above and below this opening is further traversed by transverse bores 25$^a$ equipped similarly as the bores 25 of the upper head above described. The lower head has a vertical port 32 opening through opposite ends thereof and communicating with the bores 25$^a$. This lower head has a depending threaded flange receiving a bowl 12$^a$ which serves at once as a guide for the testing device and as a seal for the lower end of the lower head.

The control element of the testing device comprises a tube 33 having at its upper and lower ends check valves 34 which open upward. The lower check valve 34 has its inner port opening through its lower end and the check valve supports at its lower end a perforated tube 35 forming a continuation of the tube 33. The upper end of the upper check valve has a catch head 36 for coaction with any suitable type of fishing tool and the outlet ports of this check valve open through the sides of the body of this valve, as indicated at 38. This testing device preferably has connected with the upper end thereof a coupling element 39.

This coupling element has an axial bore 40 through which the head 36 may be engaged. This bore adjacent its lower end communicates with downwardly diverging ports 41 opening through the exterior of the coupling so that fluid lying exteriorly to the coupling may enter the coupling or fluid pumped into the well through the bore of this coupling may pass through the space about the testing device above the packer 21. This coupling may be connected to the ordinary supporting tubing 42 by tool joints 43 or any other suitable connecting elements which provide for the communication of the bore 40 with the bore of the supporting pipe.

In the use of the apparatus above described, the control device is inserted through the bores 22 and 22$^a$ until the screen extension 35 thereof is disposed within the bowl 12$^a$. By the insertion of this control device the pistons having the weaker springs 29$^a$ are relieved of the pressure exerted thereon by the pistons having springs 29, with the result that the port 32 of the lower head places the interiors of the main tube and the bowl in communication with one another.

The air in the chambers is then exhausted in a manner hereinafter described, and the device coupled to the handling pipe and lowered into position in the well until the packer is expanded and the lower or movable plate of the packer is seated upon the bowl at the junction of the main bore and the rat-hole. This places the lower end of the testing device in the rat-hole which is, of course, formed in the pay sand. A suitable fishing tool F inserted through the supporting tubing 42 by a wire line W is then employed to engage the control element and elevate the same until the screen 35 aligns with the transverse opening 30 of the lower head. While in this position this screen still maintains the lower set of valve pistons in separated relation so that bore 32 is still open. The vacuum produced in the testing device is thus placed in communication with the rat-hole and the formation in this rat-hole is drawn through opening 30, screen 35 to bowl 12$^a$ and through port 32 to the interior of the main conduit. After a predetermined time, sufficient to enable the taking of a complete sample, the wire line W and fishing tool F may be employed to completely withdraw the control device from the testing apparatus.

After the lower end of the control device and the lower end of the screen 35 moves above and out of alignment with a pair of aligned valve pistons the stronger piston having the stronger spring will act to urge the other piston over until it cuts off the port 32. Since these pistons also serve to cut off the bore 22$^a$ it will be obvious that the lower head will be sealed at opposite sides of the port and communication between the bowl and the interior of the testing device cut off as it is withdrawn from the upper head 11, the valve pistons will similarly act to cut off the bore 22 and thus prevent entrance of any fluid to the testing device from above.

Attention is drawn to the fact that by this arrangement it is possible to have pipe 42 filled with water or slush and since the interior of this pipe is placed in communication with the exterior thereof by the coupling 39, it is possible to have the entire pipe line thoroughly mudded so that all danger of a blow out is avoided. Any one of several means may be employed for evacuating the testing device and in the present instance two such means are illustrated. In Figure 5 I have illustrated a preferred arrangement wherein the upper head 11 is formed with vertical bores 44 and 45, the former being equipped at its upper end for connection with a vacuum pump, as indicated at 46 and having arranged therein a downwardly seated check valve 47, while the latter has arranged therein a cut off valve 48 and is adapted at its upper end for application of a vacuum gauge 49. In Figure 7 a second structure is illustrated wherein the vacuum pump is directly connected to the upper head which is indicated at 11ª. The vacuum pump cylinder which is indicated at 50 has a usual reciprocating valve piston 51 and is illustrated as exhausting through its upper end as at 50'. The lower end of this cylinder is open and the connection between the lower end of the cylinder and the head 11 includes a perforated stop plate 52 having a central aperture receiving the fishing head 36 of the control member, the edges of which seat upon the upper end of the control member proper so that the vertical movement of this control member under the influence of the suction created, is prevented. Check valved ports 53 are preferably formed in the head as an outlet for the air contained in the testing device although of course, with the testing device in position the entire contents of the complete testing device could be evacuated through the testing device at its outlet ports 38.

It will be obvious that the device may be used as a dry pipe tester and without the use of vacuum by slightly altering the procedure above set forth. In order to permit of such use, it is merely necessary that the fitting 39 be omitted and that in elevating the plunger or control device 33, care being taken to leave the screen 35 with the opening 30 for a sufficient period to enable the interior pressure of the well to drive all air from both the bowl and the interior of pipe 10 from the control device through a check valve opening through the head, which may constitute either the opening 44 of Figure 5 or the openings 53 of Figure 7. By employing this method the oil may be caused to stand in pipe 42 to the depth which it would normally stand in the well and a full sample be taken.

The structure illustrated is obviously capable of a very considerable range of modification and I do not wish to be understood as limiting myself to this specific structure except as hereinafter claimed.

I claim:—

1. In oil well testing apparatus, a container adapted to be inserted in a test bore of a well and having a seal to engage and seal to the wall of the well bore at the upper end of said test bore, a tubing for supporting said container, said container being positioned below the tubing, and means controlled by a member inserted in said tube for placing the interior of the container in communication with the test bore.

2. In oil well testing apparatus, a container adapted to be inserted in a test bore of a well and having a seal to engage and seal to the wall of the well bore at the upper end of said test bore, a tubing for supporting said container, said container being positioned below the tubing, means controlled by a member inserted in said tube for first placing the interior of the container in communication with the test bore and then sealing the container against the entry or escape of fluids.

3. In oil well testing apparatus, an evacuated container adapted to be inserted in the test bore of the well and having a seal to engage and seal to the wall of the well bore at the upper end of said test bore, a tubing for supporting said container, said container being positioned below the tubing, and means controlled by a member inserted through said tubing for placing the interior of the container in communication with the test bore.

4. In oil well testing apparatus, an evacuated container adapted to be inserted in the test bore of the well and having a seal to engage and seal to the wall of the well bore at the upper end of said test bore, a tubing for supporting said container, said container being positioned below the tubing, and means controlled by a member inserted through said tubing for placing the interior of the container in communication with the test bore and then sealing the container against the entry or escape of fluids.

5. In oil well testing apparatus, a container having a port at its lower end, said container being adapted to be inserted in a test bore of a well and sealed to the wall of the well bore at the upper end of said test bore, a supporting tubing for the container, a plunger controlling communication between said port and the interior of the container, and means insertible through the tubing to engage said plunger and position it to establish communication between the port and the interior of the container.

6. In oil well testing apparatus, a container having a port at its lower end, said container being adapted to be inserted in a test bore of a well and sealed to the wall of the well bore at the upper end of said test bore, a supporting tubing for the container, a plunger controlling communication between said port and the interior of the container, means insertible through the tubing to engage said plunger and position it to establish communication between the port and the interior of the container and to subsequently completely withdraw the plunger, and means for sealing the opening in the container left by the withdrawal of the plunger.

7. In oil well testing apparatus, a container having a tubular body and opposed heads at opposite ends of said body, a port in one of said heads, aligned bores in the heads, and a plunger engaged in said bores and having means for placing the port in communication with the interior of the container when it is disposed in one position with relation thereto.

8. In oil well testing apparatus, a container having a tubular body and opposed heads at opposite ends of said body, a port in one of said heads, aligned bores in the heads, a plunger engaged in said bores and having means for placing the port in communication with the interior of the container when it is disposed in one position with relation thereto, and means for sealing the aligned bores of the container heads when the plunger is withdrawn.

9. In oil well testing apparatus, a container having a tubular body and opposed heads at opposite ends of said body, a port in one of said heads, aligned bores in the heads, a plunger engaged in said bores and having means for placing the port in communication with the interior of the container when it is disposed in one position with relation thereto, and valves mounted in said heads and closing the bores of the heads when the plunger is withdrawn.

10. In oil well testing apparatus, a container having a tubular body and opposed heads at opposite ends of said body, a port in one of said heads, aligned bores in the heads, a plunger engaged in said bores and having means for placing the port in communication with the interior of the container when it is disposed in one position with relation thereto, and valves mounted in said heads and closing the bores of the heads when the plunger is withdrawn, the lower head having valves at opposite sides of said port.

11. In an oil well testing device, a container having a tubular body and opposed heads at opposite ends of said body, the lower head having a port, a bowl engaged with the lower end of the lower head, said heads having aligned bores, a plunger engaged in said bores and comprising an imperforate body having a screen at its lower end, said screen being normally disposed in said bowl, a second port in the lower head connecting the interior of the bowl and the interior of the tubular body, a tubing supporting said container, and means insertible through the tubing for shifting the plunger to place the interior of the bowl in communication with the first named port through said screen.

12. In an oil well testing device, a container having a tubular body and opposed heads at opposite ends of said body, the lower head having a port, a bowl engaged with the lower end of the lower head, said heads having aligned bores, a plunger engaged in said bores and comprising an imperforate body having a screen at its lower end, said screen being normally disposed in said bowl, a second port in the lower head connecting the interior of the bowl and the interior of the tubular body, a tubing supporting said container, means insertible through the tubing for shifting the plunger to place the interior of the bowl in communication with the first named port through said screen and for subsequently withdrawing the plunger, and means for sealing the aligned bores of the container heads when the plunger is withdrawn.

13. In an oil well testing device, a container having a tubular body and opposed heads at opposite ends of said body, the lower head having a port, a bowl engaged with the lower end of the lower head, said heads having aligned bores, a plunger engaged in said bores and comprising an imperforate body having a screen at its lower end, said screen being normally disposed in said bowl, a second port in the lower head connecting the interior of the bowl and the interior of the tubular body, a tubing supporting said container, means insertible through the tubing for shifting the plunger to place the interior of the bowl in communication with the first named port through said screen and for subsequently withdrawing the plunger, means for sealing the aligned bores of the container heads when the plunger is withdrawn, and a valve for sealing the second named port actuated by the last named means when positioned to seal the bore of the lower head.

14. In an oil well testing apparatus, a container having a tubular body and opposed heads at opposite ends of said body, one of the heads having a port and both of the heads having aligned bores, and a plunger engaging through said bores and having means for placing the port in communication with the interior of the container when it is disposed in one position with relation thereto.

15. In an oil well testing apparatus, a container having a tubular body and opposed heads at opposite ends of said body, one of the heads having a port and both of the heads having aligned bores, valves for normally closing the bores of the heads and the port in one of said heads, and a plunger engageable through the bores of said heads, said plunger when so engaged allowing the valves to assume open positions.

16. Apparatus for testing the formation in a well bore including a tubular string adapted to be let down in a well bore and having packing means adapted to form a seal between the string and the wall of said bore, said string having a separate sample chamber therein provided with a valve controlled inlet, said chamber being normally hermetically sealed, and means for communicating the bore beneath said seal with the said sample chamber, said means being characterized by the provision of a channel through which said communication may be established, and means for opening and closing said channel.

17. Apparatus for testing the formation in a well bore including a tube adapted to be let down into a well bore, packing means for forming a seal between said tube and the walls of the bore, said tube having a separate sample chamber therein provided with an inlet, a valve controlling said inlet and normally hermetically sealing the chamber, said apparatus having channels through one of which fluid may pass through the apparatus and through the other of which fluid from the formation being tested may enter said chamber through said inlet.

In testimony whereof I hereunto affix my signature.

WILLIAM J. MILLER.